United States Patent [19]

Bredol et al.

[11] Patent Number: 5,498,369
[45] Date of Patent: Mar. 12, 1996

[54] METHOD OF MANUFACTURING ZNS PARTICLES

[75] Inventors: Michael Bredol; Jacqueline Merikhi; Cornelis Ronda, all of Aachen, Germany

[73] Assignee: U.S. Philips Corporation, New York, N.Y.

[21] Appl. No.: 278,476

[22] Filed: Jul. 20, 1994

[30] Foreign Application Priority Data

Jul. 22, 1993 [DE] Germany .......................... 43 24 594.3

[51] Int. Cl.$^6$ .......................... C09K 11/54; C09K 11/56; C01G 9/08

[52] U.S. Cl. .............................. 252/301.65; 252/301.45; 423/566.1

[58] Field of Search .................... 423/566.1; 252/301.65, 252/301.45

[56] References Cited

FOREIGN PATENT DOCUMENTS 1467316  1/1969  Germany .

*Primary Examiner*—C. Melissa Bonner
*Attorney, Agent, or Firm*—Norman N. Spain

[57] ABSTRACT

The invention relates to a method of manufacturing ZnS particles by wet-chemical precipitation from aqueous zinc salt solutions, ZnS being precipitated onto nuclei introduced into the solution. Nuclei of a controlled particle size and particle size distribution are obtained in that the nuclei of the aqueous precipitation solution are added in the form of a water-soluble organosol which contains the nuclei.

9 Claims, No Drawings

5,498,369

METHOD OF MANUFACTURING ZNS PARTICLES

BACKGROUND OF THE INVENTION

The invention relates to a method of manufacturing ZnS particles by wet-chemical precipitation from aqueous zinc salt solutions whereby ZnS is precipitated on nuclei introduced into the precipitation solution. The invention also relates to ZnS phosphors which can be manufactured by such a method and to a picture tube with a picture screen provided with such a ZnS phosphor.

ZnS particles are used in picture tubes, in particular in colour picture tubes, as phosphors (blue, green) with the relevant dopants. It is essential for the manufacture of high grade phosphor lines or points that the phosphor particles should be applied as densely and as evenly as possible. The particle sizes must not exceed certain limit values. The particle size distribution should be as narrow as possible.

ZnS basic materials for the manufacture of phosphors are usually manufactured by wet-chemical precipitation from Zn salt solutions through the introduction of hydrogen sulphide gas. The problem arises in that case that the continuously dissociated acid of the accompanying anion of the Zn salt continuously lowers the pH value. This leads to yield losses (in relation to the quantity of Zn used) and to unstable conditions in the colloidal chemical system during the reaction if isoelectric points are passed in the course of the reaction. In addition, the precipitation reaction also proceeds very quickly so that the inhomogeneous distribution of the reactants which inevitably arises through the addition of a solution or gas leads to inhomogeneous reaction conditions and thus to an uneven product. Furthermore, such conditions render the control of the nucleation impossible; however, such control is the critical factor if the morphology of the precipitate is to be controlled.

A method of the kind mentioned in the opening paragraph is known from DE-A 1 467 316. In this document, the nuclei are added to a precipitation solution as components of an aqueous suspension.

When nuclei with a narrow particle size distribution are introduced into the precipitation solution, the ZnS particles arising from the nuclei also exhibit a similar narrow particle size distribution, while the particle size can be influenced in a further manufacturing process through a suitable choice of the firing temperature and through the addition of suitable fluxes. The eventual size and size distribution of the ZnS particles is substantially dependent on the size, size distribution, and nature of the nuclei. The surface chemistry of the nuclei also plays a major part.

SUMMARY OF THE INVENTION

The invention has for its object to modify the method of the kind mentioned in the opening paragraph in such a way that ZnS is precipitated on nuclei which are present with a controlled size and size distribution.

This object is achieved in that the nuclei of the aqueous precipitation solution are added in the form of an organosol which contains the nuclei and is soluble in water.

The method according to the invention is particularly suitable for the manufacture of ZnS basic materials for fine-particle phosphor material (particle sizes 1 to 2 μm).

DETAILED DESCRIPTION OF THE INVENTION

Nuclei may consist of any substance, as desired, but certain substances are particularly suitable for certain organic solutions of the organosols. The choice should be made such that a stable organosol is obtained in which the number and particle size distribution of the nuclei remain unchanged for as long as possible. The nuclei should not agglomerate, or at least form only loose clusters which fall apart during the subsequent precipitation process.

If ZnS is to deposit practically exclusively on nuclei during the precipitation process, the reactants should be added in a controlled manner (for example, controlled gas flows) in the growth phase so as to avoid supersaturation and to avoid that further nuclei could be created.

Nucleus-forming reactants should also be added in dosed, controlled quantities in the manufacture of the organosol so that a desired number, size and narrow size distribution of the nuclei can be achieved according to plan. Suitable process parameters may advantageously be determined by means of pilot tests.

Stable sols of nuclei arise in the organic medium, which sols can be stored without changes in their properties for a longer period at least when cooled. Organosols used in accordance with the invention may be manufactured in a concentrated form separately from the subsequent precipitation process. Organosols with a plurality of nucleus types may be manufactured. For example, nuclei may also be realised which perform a function as activator materials. It is essential for the choice of nucleus types that suitable precursor materials are found which dissolve well in the chosen solvent and which are available in water-free form (acetate, acetylacetonate, etc.).

Particularly suitable organosols can be formed with dimethyl formamide (DMF). The nuclei are held stable in the distribution achieved in a controlled manner thereby also during longer storage times.

Commercially available surface active material (sulphonic acid soaps such as AOT, etc. ) may often help out in the case of insufficient stability.

Dimethyl sulphoxide (DMSO) was found to be similarly advantageous.

A suitable organosol for the invention may also be manufactured with acetone.

The following embodiments were found to be especially suitable. The concentrations and reaction times indicated may obviously be adapted and varied so as to achieve different particle sizes. The ZnS powders obtained may be processed further into phosphors by means of a known process. Preferably, the ZnS powders obtained by means of the invention are mixed with dopants and elementary sulphur into an aqueous suspension, which is subsequently inspissated. The powder thus obtained is then heated under exclusion of oxygen at 980° C. for a typical period of 90 minutes.

EXAMPLE 1

2 g Cu(II) acetate (free from Water) were dissolved in 150 ml dry dimethyl formamide (DMF). Approximately 750 ml $H_2S$ were introduced into this solution at atmospheric pressure in a mixture with argon (1:1) over a time span of 90 minutes. The solution was then passed through a fine filter (200 nm membrane filter) to separate it from any $Cu_2S$ which may have flaked out. A portion of this basic solution was diluted hundredfold with DMF. This solution contained the desired nuclei in a suitable concentration. 16 ml of this solution were added to a solution of 29.4 g $ZnSO_4 \cdot 7H_2O$ in 150 ml water. A bright green, clear solution was obtained over which a gas mixture of $H_2S$ and Ar (1:1) was passed at a rate of 0.17 ml/s $H_2S$ under vigorous stirring. A clouding immediately manifested itself. After 4.25 h the gas supply was ended and the product was isolated by filtration. A very fine powder with particle sizes of approximately 200 nm was obtained. After drying, it was activated into a phosphor in the manner indicated above and fired. The result was a fine phosphor powder (1–2 µm) with a very narrow band of particle size distribution.

EXAMPLE 2

3.4 g N-dimethyl dithiozinc carbamate ($C_6H_{12}N_2S_4Zn$) were dissolved in 250 ml dry DMF. A $H_2S$/Ar mixture (2:1) was introduced into this solution at a rate of 0.34 ml/s $H_2S$ for 30 minutes. The resulting yellow, cloudy solution was passed through a fine filter (for example, 200-nm membrane filter). 125 ml of the clear yellow solution obtained were added to a solution of 25.7 g $ZnSO_4*7H_2O$ in 100 ml water. For three hours, a $H_2S$/Ar mixture (1:1) was passed over the resulting clear, yellowish solution at a rate of 0.17 ml/s $H_2S$ under vigorous stirring. After filtration, a very fine powder with particle sizes of approximately 200 nm was obtained. After drying, it was activated into a phosphor in the manner indicated above and fired. A fine phosphor powder (1–2 µm) was obtained with a very narrow band of particle size distribution.

EXAMPLE 3

A saturated solution of S in acetone was prepared with solid sulphur and acetone. The S-content was approximately 90 mg in 100 ml acetone (at a usual residual moisture content). 8.8 ml of this solution were added to a stirred 0.6-mole $ZnSO_4$ solution (1.5 l). A sol resulted which manifested the typical effects of Rayleigh scattering, i.e. a blue shine upon observation perpendicular to daylight passing through. ZnS could be precipitated from the solution thus prepared by passing $H_2S$ over it in usual manner, and isolated.

In this embodiment S-nuclei are generated on which subsequently ZnS may be precipitated. The initial solution is not a sol of particles but a saturated solution. Nucleation takes place through addition of $ZnSO_4$ solution or of water, whereby the solubility of S is reduced. Nuclei arise in situ upon the advantageous addition of S solution to the prepared $ZnSO_4$ solution. These nuclei have a surface chemistry which is advantageous for the further process steps.

We claim:

1. A method of manufacturing ZnS particles precipitated on nuclei, said method comprising:

a) adding nuclei-forming reactants to an organic solvent to thereby form a water-soluble organosol containing said nuclei, b) dissolving said organosol in an aqueous solution of a zinc salt and c) introducing $H_2S$ into said solution to hereby precipate ZnS particles on said nuclei.

2. The method of claim 1 wherein the organic solvent is selected from the group consisting of dimethylformamide, dimethylsulfoxide and acetone.

3. The method of claim 2 wherein the organosol is produced by:

a) dissolving water-free Cu(II) acetate in dry dimethylformamide, b) introducing an $H_2S$/Ar mixture into the resultant solution, and then c) filtering said solution.

4. The method of claim 2 comprising:

a) Dissolving N-diethyl dithiozinc carbamate ($C_6H_{12}N_2S_4Zn$) in dry dimethylformamide, b) introducing $H_2S$ into the resultant solution, c) filtering the solution, d) adding said resultant filtered solution to an aqueous $ZnSO_4$ solution to form a second solution and then e) introducing an $H_2S$/Ar mixture into said second solution while vigorously stirring said second solution.

5. The method of claim 2 wherein the organosol is produced by:

a) preparing a saturated solution of elemental sulfur in acetone, and b) adding the resultant solution to an aqueous solution of a zinc salt.

6. A method of producing a ZnS phosphor comprising a) drying the ZnS particles precipitated on nuclei produced by the method of claim 1 to form a powder, b) adding dopants and/or elemental sulfur to said powder and c) then heating said powder in an oxygen-free atmosphere.

7. A method of producing a ZnS phosphor comprising a) drying the ZnS particles precipitated on nuclei produced by the method of claim 2 to form a powder, b) adding dopants and/or elemental sulfur to said powder and c) then heating said powder in an oxygen-free atmosphere.

8. The method of claim 1 wherein the $H_2S$ is introduced as mixture with Ar.

9. The method of claim 2 wherein the $H_2S$ is introduced as a mixture with Ar.

* * * * *